No. 681,986. Patented Sept. 3, 1901.
F. SCHUMANN.
MAIN STOP VALVE.
(Application filed Dec. 10, 1900.)
(No Model.) 2 Sheets—Sheet 1.
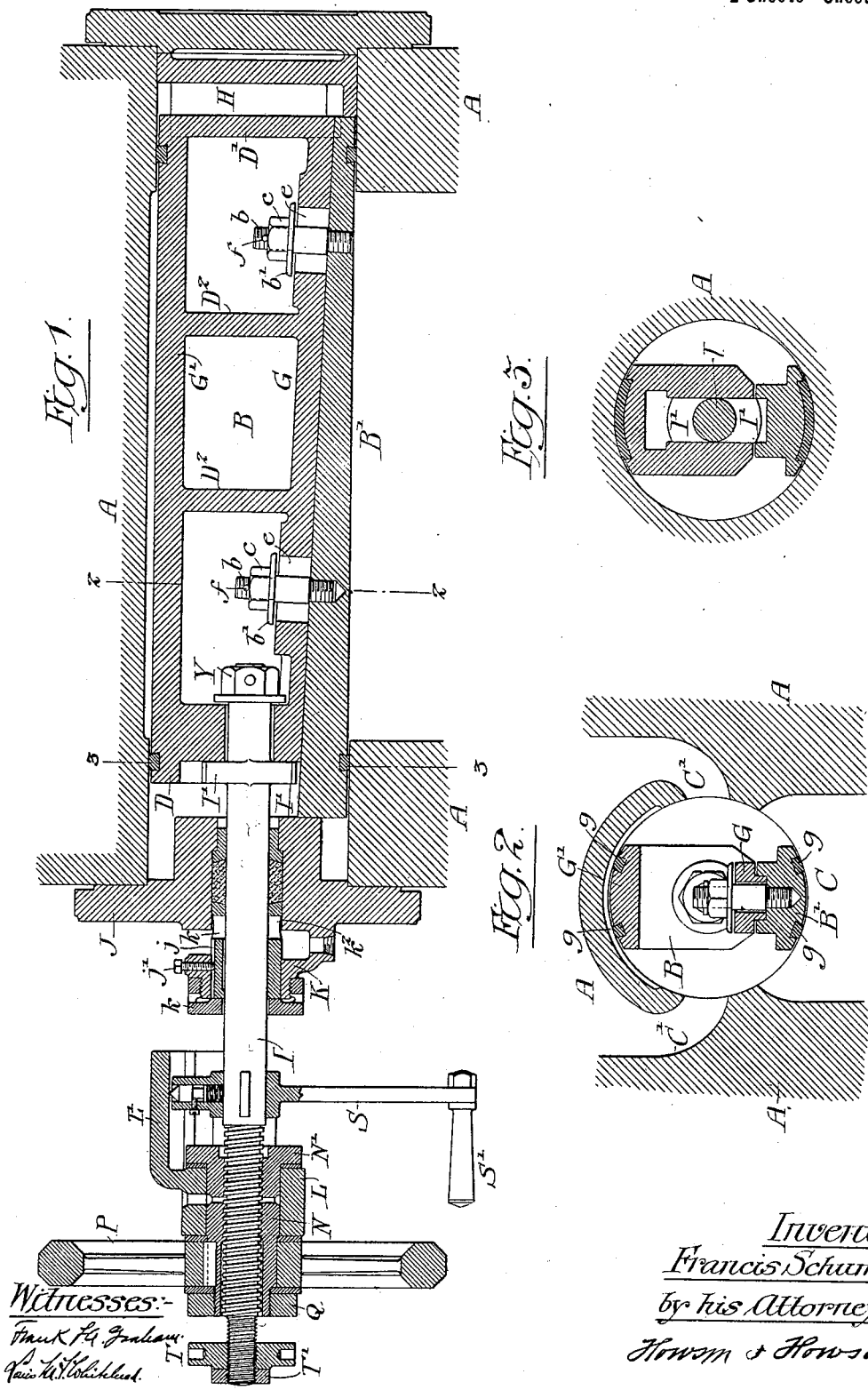
Witnesses:—
Inventor:—
Francis Schumann
by his Attorneys:—
Howson & Howson

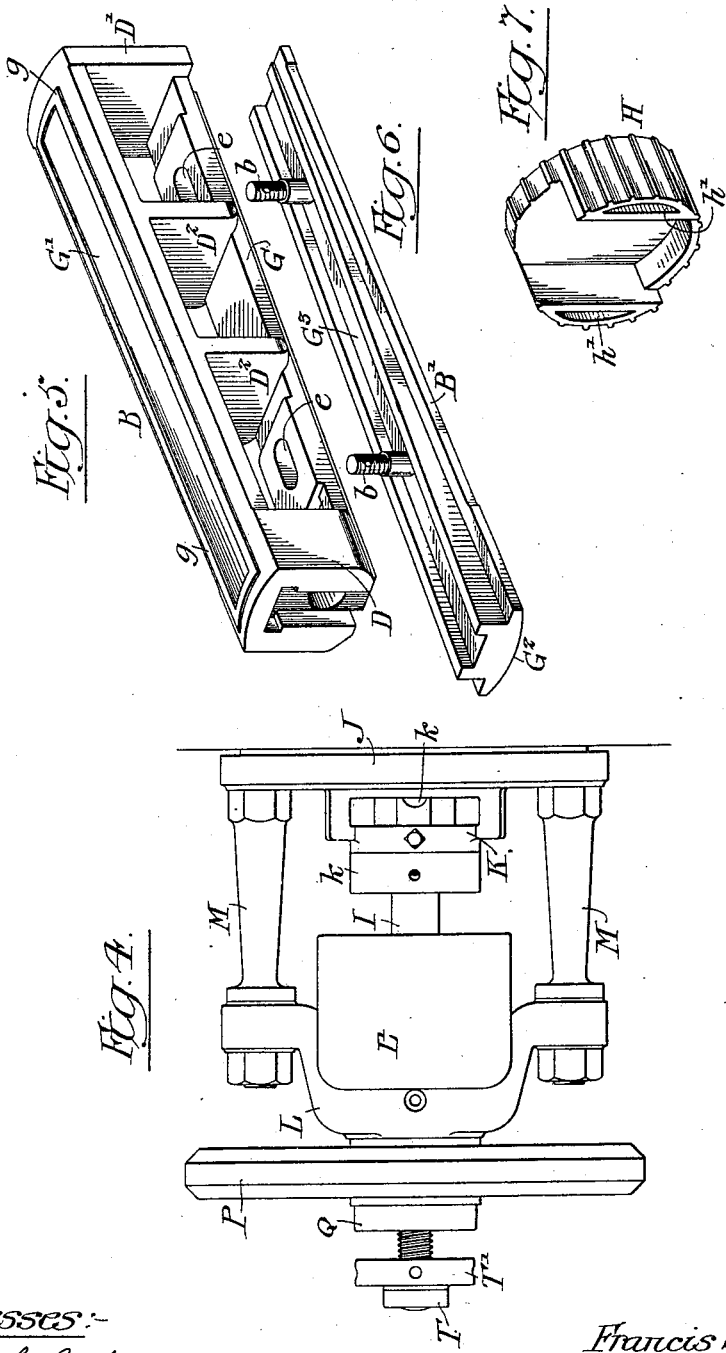

UNITED STATES PATENT OFFICE.

FRANCIS SCHUMANN, OF PHILADELPHIA, PENNSYLVANIA.

MAIN STOP-VALVE.

SPECIFICATION forming part of Letters Patent No. 681,986, dated September 3, 1901.

Application filed December 10, 1900. Serial No. 39,394. (No model.)

*To all whom it may concern:*

Be it known that I, FRANCIS SCHUMANN, a citizen of the United States, residing in Philadelphia, Pennsylvania, have invented certain Improvements in Main Stop-Valves, of which the following is a specification.

My invention relates to certain improvements in main stop-valves for use in connection with steam, water, and other fluid conveying conduits, having for its object the provision of a valve which may be opened or closed in a minimum time and which when closed may be made perfectly tight. These objects I attain as hereinafter set forth, reference being had to the accompanying drawings, in which—

Figure 1 is a longitudinal sectional view of of my improved valve. Fig. 2 is a transverse sectional view on the line 2 2, Fig. 1, showing the relative positions of the ports, the valve being open. Fig. 3 is a transverse sectional view on the line 3 3, Fig. 1, showing the connection between the valve-rod and the valve. Fig. 4 is a view showing the yoke-support for the operating mechanism of the valve and indicating the preferred construction of the stuffing-box. Figs. 5 and 6 are detached perspective views of the two sections of the valve, and Fig. 7 is view of the end plate of the valve.

In the drawings, which show my device used as a throttle-valve on a steam-engine, A is the main casing of the valve, in which are ports C' C', of preferably rectangular section, leading from a source of steam-supply and opening into opposite sides of the valve-chamber. A port C in the present instance leads to the steam-inlet valves of the engine.

The valve proper is formed of two sections B B', one arranged to slide upon the other for a reason set forth hereinafter. The two sections are loosely held together by stud-bolts $b$ projecting from the section B' and entering slots $e$ in the inclined face G of the section B. These bolts have each a washer $b'$ and a nut $c$, the nuts being retained in position by cotter-pins $f$ in the present instance. The adjacent faces of the two valve-sections B and B' are preferably made with a tongue and a groove, respectively, allowing them to be moved longitudinally upon one another, while maintaining them rigidly in the same plane. The section B of the valve is preferably made as shown in Fig. 5, having a tapered face G, a curved face G', ends D $d'$, and intermediate ribs $D^2$. The section B' of the valve is preferably made solid, as shown in Fig. 6, and has a curved face $G^2$ and a tapered face $G^3$ of the same taper as the face G of the section B. Undercut slots $g$ are formed in each curved face of the valve and a suitable form of packing is placed in the slots, which assists in making the valve tight. An end-thrust plate H, of the form shown in Figs. 1 and 7, has tooth-like projections on its periphery and passages $h'$ through its body, all of which allow access of the fluid in the chamber to all parts of the plate, and thereby serve to keep it balanced.

From their wedge-shaped construction it will be seen that by moving the two valve-sections longitudinally on one another their combined diameter will be increased or diminished, and in order that this operation may be readily performed the end of one of the sections (preferably B) is made with a recess, into which fit two arms or projections I' of a valve-rod I. This rod extends through the end D of the valve-section B and has on its end a washer and a nut Y, the latter being pinned. The bonnet J, through which it also passes, is formed with a stuffing-box K and has a gland therein of special construction. The bonnet-casting has an extension formed with a recess $j$ in it, the end of the extension being threaded to receive the gland-cap. The gland-ring is made with oil-holes $k'$ and $k^2$ in it for the reception of oil and the discharge of any drip. A screw $j'$ in the bonnet-casting engages a flat space on the gland and serves to keep the latter from rotating with the rod. A yoke-piece L, supported on posts M, attached to the valve-bonnet, has in it an internally-threaded bushing N. This latter has a flange N', at one end and the opposite end is threaded externally to receive a nut Q. The valve-rod I is threaded to fit the internal thread of the bushing. Keyed to the bushing N is a hand-wheel P, so that on turning the hand-wheel and bushing the valve-rod and the section B of the valve will be moved longitudinally. An operating-lever S is secured to the valve-rod I between the bushing N and the bonnet J, being keyed to the rod in the present instance. This lever is for the purpose of turning the valve to open or close the ports, and the hand-wheel P is for the purpose of expanding the valve, thus bringing their sections tightly to their seats. In a recess in the head of the lever S is a pin R, projected by a spring $r$. This pin has a groove $r'$, into which extends a pin $r^2$, limiting the movement of the lever. On the yoke L is an extension in the form of a segment having notches for the reception of the pin R on the lever, so that the pin will hold the valve either in the open or closed position. The extreme end of the valve-rod is threaded and on it is a stop-nut T', kept in its place by the lock-nut T. This nut T' limits the inward movement of the valve-rod.

The operation of my valve is as follows: If the valve is in the position shown in Fig. 2, fluid will pass from the port C' to the port C, the two sections being loose in the valve-chamber, and in order to close the valve the rod I is given a quarter-turn by means of the arm S. This brings the two sections of the valve immediately over the ports C' C', and the hand-wheel P is now turned in a direction to move the rod outwardly, thereby moving the section B longitudinally on the section B', expanding the valve and causing the sections to seat themselves tightly over the ports. In opening the valve the hand-wheel P would be turned in the opposite direction from above, thereby moving the valve-section B back, decreasing the diameter of the valve, and the rod may be turned by the lever S; but I so arrange the nut in respect to the bushing N that by the time the diameter of the valve is small enough for it to turn freely in the chamber the nut T has jammed against the adjacent face of the bushing, whose continued rotation will turn the valve to its open position clear of the ports.

It will be noted that by the above-described construction I am enabled to quickly open and close a passage leading through a valve structure and to make the valve perfectly tight when closed. The wear upon the valve seats and faces is practically nothing, and the elements requiring attention are reduced to a minimum.

I claim as my invention—

1. The combination of a casing forming a valve-chamber, ports opening into said chamber, a valve consisting of two wedge-shaped sections constructed to operate in the chamber, a valve-rod engaging the valve, with means attached to the outside of the rod for moving one of said sections longitudinally upon the other, and independent means also attached to said valve-rod for rotating the valve, substantially as described.

2. In a stop-valve for fluids, the combination of a casing, ports therein, a valve in the casing consisting of two wedge-shaped sections, a longitudinal groove in one section and a tongue or projection on the other section fitting said groove, a valve-rod connected to said valve with means for rotating the same with the attached valve and independent means connected to the outside of said rod for moving it longitudinally, and thereby also moving one valve-section upon the other, substantially as described.

3. The combination in a stop-valve, of a casing forming a cylindrical chamber, ports opening into the chamber, two wedge-shaped valve-sections in the chamber, a valve-rod attached to one of the sections, means for moving the rod longitudinally and an independent operating-arm for rotating the rod, substantially as described.

4. The combination with a two-section valve of the character described, of a valve-casing, a valve-rod, projections thereon engaging one of the valve-sections, whereby the section is made to turn when the rod is turned, a thread on the outside end of the rod, a yoke carried by the valve-casing, a threaded bushing in the yoke, through which the threaded part of the valve-rod passes, a hand-wheel keyed to the bushing, substantially as described.

5. The combination in a stop-valve, of a casing forming a cylindrical chamber, two wedge-shaped valve-sections, means for operating the said sections, and an end-thrust plate engaging the said valve-sections, said plate having a grooved periphery and passages through its body, substantially as described.

6. The combination of a valve-casing forming a cylindrical valve-chamber, ports therein, a valve consisting of two sections, each of said sections having a face circular in outline constructed to fit over and close the said ports, undercut grooves in each face of the valve and packing in the grooves, substantially as described.

7. The combination in a valve of the character described, of a casing forming a cylindrical valve-chamber, a bonnet or cover-plate, a valve in the chamber, and a valve-rod connected to the valve extending through the bonnet, a stuffing-box in the bonnet around the rod, a threaded extension of the bonnet having a gland-cap thereon, said extension having in it a recess, a gland in the stuffing-box and apertures through said extension, substantially as described.

8. The combination of a valve-casing, its ports, a two-part cylindrical valve, one part longitudinally movable on the other to increase or diminish the diameter of the valve, a valve-rod attached to one part, an operating-lever on said rod, a pin in the lever, a fixed segment having notches with which the pin engages and means for moving the rod longitudinally, substantially as described.

9. The combination with a valve of the character described, of a yoke-piece secured to the casing of the valve, a notched quadrant, a threaded bushing constructed to be supported by the yoke, a valve-rod fitting the threaded interior of the bushing, said rod having on its extreme end a nut, an operating-arm keyed to the rod, a pin in the same constructed to engage the said quadrant and a hand-wheel keyed to the threaded bushing, substantially as described.

In testimony whereof I have signed my name to this specification in the presence of two subscribing witnesses.

FRANCIS SCHUMANN.

Witnesses:
WILLIAM E. BRADLEY,
JOS. H. KLEIN.